US011977435B2

(12) United States Patent
Emura (10) Patent No.: US 11,977,435 B2
(45) Date of Patent: May 7, 2024

(54) ACCESS METHOD, COMMUNICATION SYSTEM, AND NON-TRANSITORY COMPUTER READABLE MEMORY

(71) Applicant: RAKUTEN GROUP, INC., Tokyo (JP)

(72) Inventor: Sadaaki Emura, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 1 day.

(21) Appl. No.: 17/733,524

(22) Filed: Apr. 29, 2022

(65) Prior Publication Data

US 2022/0358007 A1    Nov. 10, 2022

(30) Foreign Application Priority Data

May 6, 2021   (JP) .................................. 2021-78554

(51) Int. Cl.
*G06F 11/00* (2006.01)
*G06F 11/07* (2006.01)
*G06F 11/32* (2006.01)

(52) U.S. Cl.
CPC ...... *G06F 11/0772* (2013.01); *G06F 11/0775* (2013.01); *G06F 11/0787* (2013.01); *G06F 11/327* (2013.01)

(58) Field of Classification Search
None
See application file for complete search history.

(56) References Cited

U.S. PATENT DOCUMENTS

| | | | |
|---|---|---|---|
| 2010/0058108 A1* | 3/2010 | Nammatsu | H04L 41/0677 714/39 |
| 2010/0157964 A1* | 6/2010 | Yoon | H04W 76/18 370/338 |
| 2018/0107566 A1* | 4/2018 | Hardy | G06F 11/2033 |
| 2020/0151042 A1* | 5/2020 | Spencer | G06N 20/00 |
| 2022/0358380 A1* | 11/2022 | Huh | G06F 11/0709 |

FOREIGN PATENT DOCUMENTS

| | | |
|---|---|---|
| CN | 112035341 A | 12/2020 |
| JP | 2010-273297 A | 12/2010 |
| JP | 2011-39807 A | 2/2011 |
| JP | 2015-52882 A | 3/2015 |

OTHER PUBLICATIONS

Google Scholar/Patents search—text refined (Year: 2023).*
Google Scholar/Patents search—text refined (Year: 2024).*

* cited by examiner

*Primary Examiner* — Christopher S Mccarthy
(74) *Attorney, Agent, or Firm* — Sughrue Mion, PLLC (57) ABSTRACT

An operator terminal 2 accesses a web server 1 via a network NW, and acquires error information on an error that has occurred in the access to the web server 1. And then, the operator terminal 2 determines whether or not the occurred error is an error of a specific type on a basis of the error information, and re-accesses the web server 1 in response to the determination that the occurred error is the error of the specific type.

18 Claims, 9 Drawing Sheets

ERROR SCREEN EXAMPLE 1

Network disconnected
PLEASE TRY AGAIN LATER.

FIG. 3B

ERROR SCREEN EXAMPLE 2

SERVER MAINTENANCE IS CURRENTLY UNDERWAY.

PLEASE WAIT FOR A WHILE UNTIL THE MAINTENANCE IS COMPLETED.

MAINTENANCE IS SCHEDULED TO END AT 11:00 ON 2021/05/05.

ACCESS METHOD, COMMUNICATION SYSTEM, AND NON-TRANSITORY COMPUTER READABLE MEMORY

CROSS REFERENCE TO RELATED APPLICATION

This application claims priority from Japanese Patent Application No. 2021-78554 which was filed on May 6, 2021, the disclosure of which is herein incorporated by reference in its entirety.

BACKGROUND

Technical Field

The present invention relates to a method for handling an error that has occurred in access to a server, and the like.

Related Art

Conventionally, there is known a technique for automatically detecting an operation state of a server by detecting an error output from the server. For example, JP 2015-052882 A discloses a method for detecting an operation state of a WEB application program. In this method, an operation request is transmitted to a WEB server on which the WEB application is disposed, and response data from the WEB server is acquired. Then, it is checked whether the response data includes an error code stored in the target error code list storage unit. According to this method, the operation test can be simply performed on all the functions of the WEB application program distributed to the actual environment server.

By the way, when a server is accessed and an operation test is executed, there is a case where the operation test cannot be executed due to an error occurring at the time of the access. In this case, for example, in the case of a temporary error caused by network instability and the like, retry should be promptly executed. However, in the case of an error that is not resolved early, retry should not be executed. Such a problem is not limited to one that accesses the server and executes an operation test, and is a general problem in the access to the server.

Therefore, one or more embodiments of the present invention are directed to providing an access method, a communication system, and a non-transitory computer readable memory capable of appropriately controlling re-access in a case where an error occurs in the access to the server.

SUMMARY

In response to the above issue, an access method executed by a computer, includes: accessing a predetermined server; acquiring error information on an error that has occurred in the access to the server; determining whether or not the error that has occurred is an error of a specific type on a basis of the error information; and re-accessing the server in response to the determination that the error is the error of the specific type.

The error of the specific type may be a temporary error that can be resolved with a lapse of time.

The error information may be error character information extracted from an error screen displayed on the computer.

The error information may be an image of an error screen displayed on the computer.

The error information may be error character information obtained from a console of software for giving a predetermined command to the server.

The error information may include at least one of error character information extracted from an error screen displayed on the computer and error character information obtained from a console of software for giving a predetermined command to the server, and an image of the error screen displayed on the computer. The access method may include: determining whether or not the error that has occurred is the error of the specific type on a basis of the error character information; and determining whether or not the error that has occurred is the error of the specific type on a basis of the image of the error screen.

It may be determined whether or not the error that has occurred is the error of the specific type on the basis of the image in response to the determination that the error that has occurred is not the error of the specific type on the basis of the error character information.

The determination may be performed using a learned model learned by learning data in which error information on the error that has occurred or an error that can occur in access to at least one of the server and another server is an input and a value as to whether the error is the error of the specific type is an output.

The access method may include: setting a timing for re-accessing the server on the basis of the error information; and re-accessing the server on the basis of the set timing in response to the determination that the error is the error of the specific type.

The access method may be executed when an operation test of the server is performed.

A communication system includes one or more computers including at least one memory configured to store program code; and at least one processor configured to access the program code and operate as instructed by the program code. The program code includes: a first access code configured to cause the at least one processor to access the server; an acquisition code configured to cause the at least one processor to acquire error information on an error that has occurred in the access to the server; a determination code configured to cause the at least one processor to determine whether or not the error that has occurred is an error of a specific type on the basis of the error information; and a second access code configured to cause the at least one processor to re-access the server in response to the determination that the error is of the specific type.

A non-transitory computer readable memory has stored thereon a program configured to cause a computer to: access the server; acquire error information on an error that has occurred in the access to the server; determine whether or not the error that has occurred is an error of a specific type on the basis of the error information; and re-access the server in response to the determination that the error is of the specific type.

DETAILED DESCRIPTION

Hereinafter, one or more embodiments of the present invention will be described with reference to the drawings. The following embodiments is embodiments in a case where the present invention is applied to a communication system including a web server (an example of a predetermined server), and a case where an operation test of the web server is performed is taken as an example.

[1. Configuration and Function Outline of Communication System S]

Figure 1:
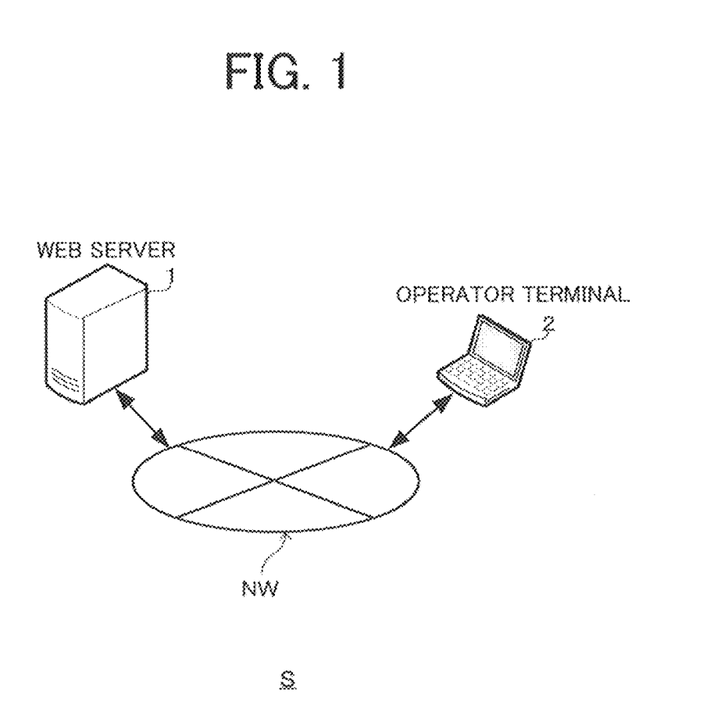
FIG. 1 is a diagram illustrating a schematic configuration example of a communication system S.

First, a configuration and function outline of a communication system S according to a present embodiment will be described with reference to FIG. 1 and the like. FIG. 1 is a diagram illustrating a schematic configuration example of the communication system S. As illustrated in FIG. 1, the communication system S includes a web server 1, an operator terminal 2, and the like. The web server 1 is a server that provides a website on a network NW. Examples of the web site include, but are not particularly limited to, an information providing site, an e-commerce site, a reservation site, an SNS (Social Networking Service) site, and the like. The operator terminal 2 can access the web server 1 via the network NW. The network NW includes, for example, the Internet, a mobile communication network, its radio base station, and the like. Incidentally, although one web server 1 is illustrated in the example of FIG. 1, there may be a large number of web servers to be subjected to the operation test in the present embodiment.

Figure 2A:
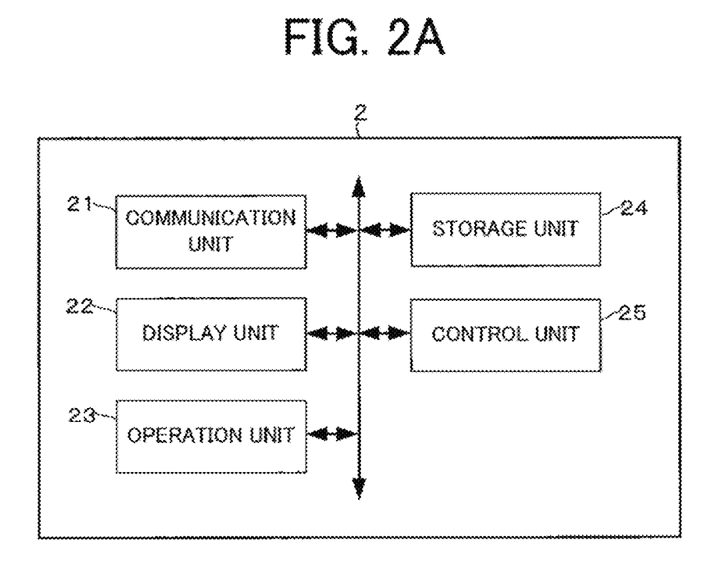
FIG. 2A is a block diagram illustrating a schematic configuration example of an operator terminal 2.
Figure 2B:
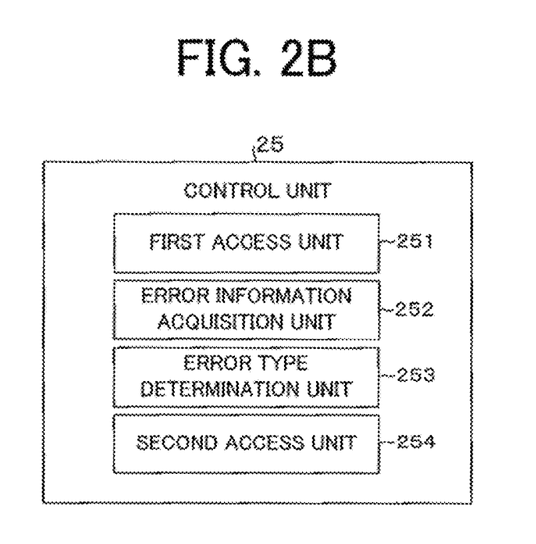
FIG. 2B is a diagram illustrating an example of a functional block in a control unit 25.

The operator terminal 2 is a terminal used for the operation test of the web server 1. The operator terminal 2 is used by an operator (for example, a person who performs the operation test). As the operator terminal 2, for example, a personal computer (PC), a smartphone, a tablet, and the like can be applied. FIG. 2A is a block diagram illustrating a schematic configuration example of the operator terminal 2. FIG. 2B is a diagram illustrating an example of a functional block in a control unit 25. As illustrated in FIG. 2A, the operator terminal 2 includes a communication unit 21, a display unit 22, an operation unit 23, a storage unit 24, the control unit 25, and the like. The communication unit 21 has a function of connecting to the network NW. The control unit 25 can access the web server 1 through the communication unit 21. The web page transmitted from the web server 1 is received by the communication unit 21. Such a web page is composed of, for example, structured document data such as HTML (Hyper Text Markup Language) or XHTML.

The display unit 22 has a function of displaying various screens on a display. For example, a screen prepared in advance or a screen of the web page is displayed by the display unit 22. The operation unit 23 has a function of receiving an operation of an operator. The operation of the operator includes, for example, designation of a button provided on the web page, a character input to an input field, and the like. Such an operation can be performed by, for example, a mouse, a finger, and the like. Examples of the button provided on the web page include a button for browsing information (including item information), a button for searching for information, a button for purchasing an item (e.g., product), and the like.

The storage unit 24 includes, for example, an HDD (Hard Disk Drive), a non-volatile semiconductor memory, and the like, and stores programs such as an OS (Operating System), a web browser, an automatic test tool, and an error analysis program. The error analysis program may be stored in a non-transitory computer readable memory. The control unit 25 (an example of a computer) includes at least one CPU (Central Processing Unit), a ROM (Read Only Memory), and a RAM (Random Access Memory), and the like. The CPU (an example of processor) is configured to access a program code stored in the storage unit 24 (or the ROM) and operate as instructed by the program code.

The error analysis program is, for example, an application that causes the control unit 25 to function as a first access unit 251, an error information acquisition unit 252, an error type determination unit 253, and a second access unit 254. The program code of the error analysis program includes: a first access code configured to cause the CPU to access a server; an acquisition code configured to cause the CPU to acquire error information on an error that has occurred in the access to the server; a determination code configured to cause the CPU to determine whether or not the error that has occurred is an error of a specific type on the basis of the error information; and a second access code configured to cause the CPU to re-access the server in response to the determination that the error is of the specific type. The program code further may include a setting code configured to cause the CPU set a timing for re-accessing the server on the basis of the error information.

The automatic test tool is an example of software for giving a predetermined command to the web server 1. The automatic test tool is, for example, a script that records in advance a scenario of an operation such as designation of a button provided on the web page and outputs a command corresponding to the scenario by reproducing the scenario. The scenario is a series of procedures. Outputting a command means, for example, transmitting a command to the web server 1. According to such a command, the operation test of the web server 1 can be performed. The operation test of the web server 1 may include a GUI (Graphical User Interface) test.

The first access unit 251 accesses the web server 1 via the communication unit 21 and the network NW. For example, the first access unit 251 accesses the web server 1 by setting a URL (Uniform Resource Locator) of the web server 1 in the web browser. In such an access, connection establishment processing (for example, handshaking and the like) for establishing a connection between the operator terminal 2 and the web server 1 is executed, and test processing is executed according to the automatic test tool after the connection is established. Incidentally, in the present specification, "access" is to be from the start of the connection establishment processing to the end of the test processing. Alternatively, in the present specification, the "access" is to be from the start of the connection establishment processing to the time when it becomes difficult (or impossible) to proceed due to an error in the middle of any processing. However, the "access" may be either from the start to the end of the connection establishment processing (alternatively, until it becomes difficult (or impossible) to proceed in the middle of such processing) or from the start to the end of the test processing (alternatively, until it becomes difficult (or impossible) to proceed due to an error in the middle of such processing).

Figure 3A:
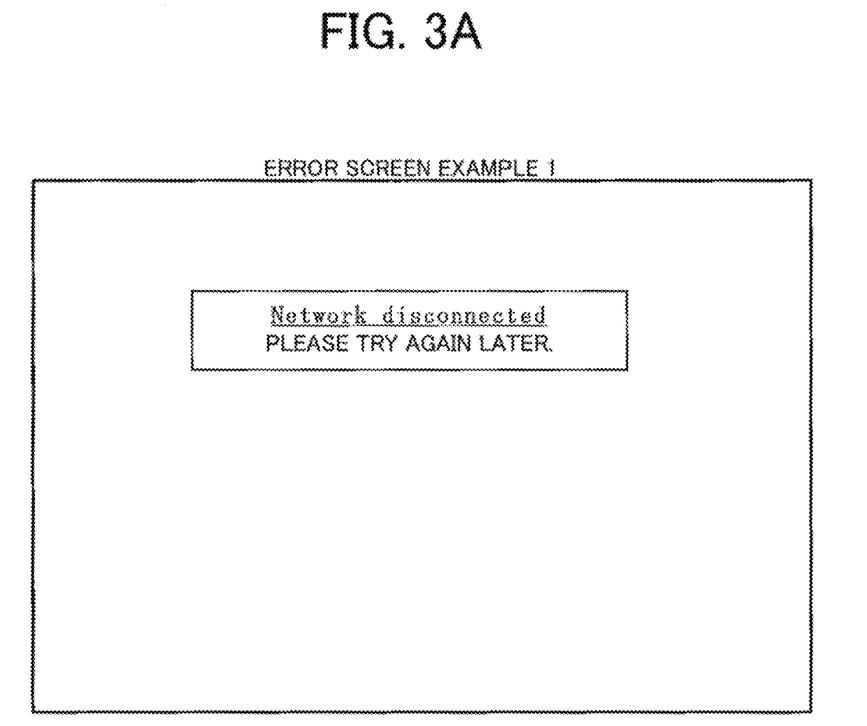
FIG. 3A is a diagram illustrating an example 1 of an error screen.
Figure 3B:
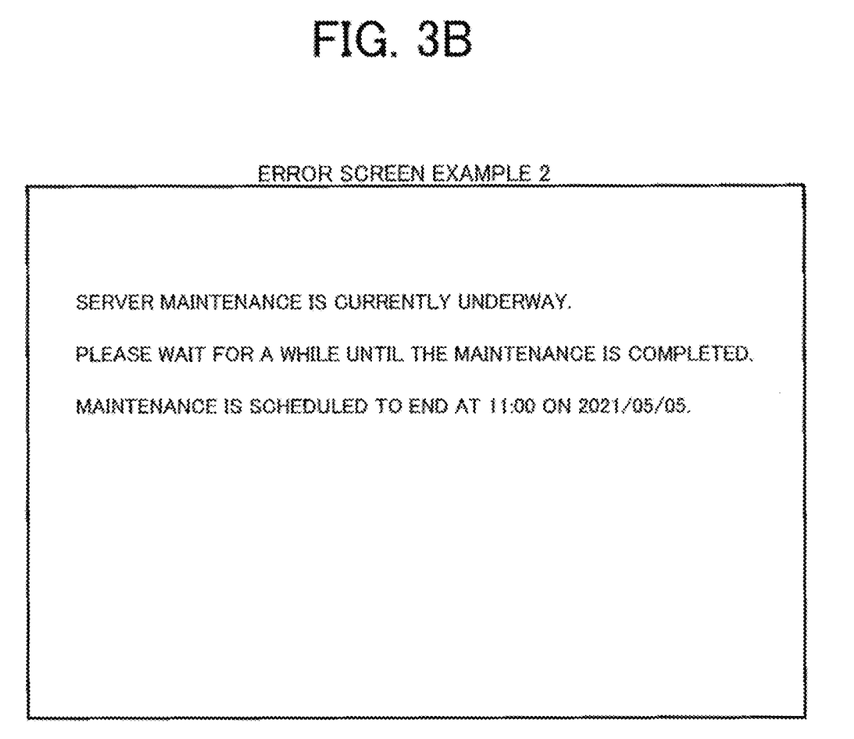
FIG. 3B is a diagram illustrating an example 2 of an error screen.
Figure 3C:
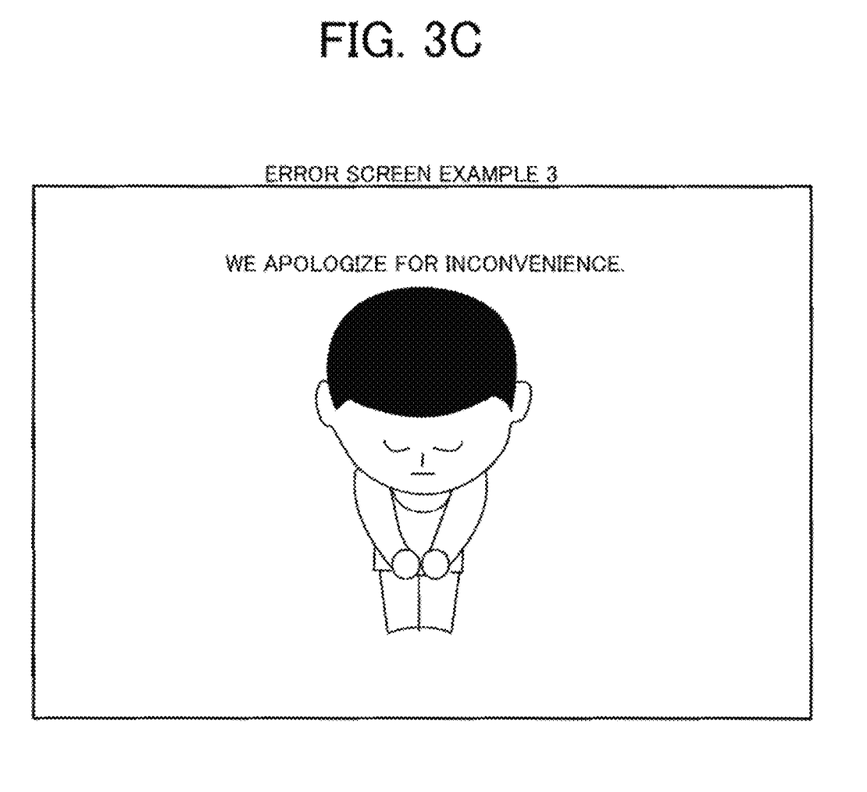
FIG. 3C is a diagram illustrating an example 3 of an error screen.

When detecting an error that has occurred in the access to the web server 1, the error information acquisition unit 252 acquires error information on the occurred error (that is, the error that has occurred). Here, the error is, for example, some kind of failure in the connection establishment processing or the test processing. The error information may be error character information (text data) extracted from an error screen displayed on the display when an error occurs, or may be an image (image data) of the error screen. The error character information may be a character itself copied from the error screen, or may be information recognized as a character by OCR (Optical Character Recognition) from the error screen. Moreover, the image of the error screen is a screenshot (hereinafter, referred to as an "error image") in which the error screen is captured. FIGS. 3A to 3C are diagrams illustrating examples 1 to 3 of the error screen. Moreover, the error information may be error character information (for example, a console error message) obtained from the console of the automatic test tool. The console of the automatic test tool is a console user interface (in other words, the character user interface), and is a function for realizing interaction with the operator by character information.

The error type determination unit 253 determines whether or not the occurred error is an error of a specific type on the basis of the error information acquired by the error information acquisition unit 252. Here, the error of a specific type is a temporary error that can be resolved with the lapse of time among a plurality of types of errors. Such a temporary error is, for example, an error that occurs when a certain place in the communication system S temporarily enters an unstable state (for example, network instability).

Examples of the error of a specific type include the following errors (i) to (v).

(i) An error indicating that it is difficult (or impossible) for connection to the network NW to establish as illustrated in FIG. 3A

(ii) An error indicating that some kind of problem has occurred in the web server 1 (for example, 500 error)

(iii) An error indicating that the limit of the number of simultaneous accesses to the web server 1 has been exceeded (for example, 503 error)

(iv) An error indicating that the web server 1 is under maintenance as illustrated in FIG. 3B

(v) A temporary error predictable from an image as illustrated in FIG. 3C

On the other hand, examples of errors other than the error of the specific type among the plurality of types of errors include the following errors (vi) to (viii).

(vi) An error caused by a bug in the web application program in the web server 1

(vii) An error due to a bug in the script of the automatic test tool (viii) An error caused by test data (for example, invalid test data) and scenarios (for example, an inappropriate scenario) used in the automatic test tool Moreover, in a case where error character information is included in the error information acquired by the error information acquisition unit 252, the error type determination unit 253 may determine whether or not the occurred error is the error of the specific type on the basis of the error character information. The error character information is at least one of the error character information extracted from the error screen and the error character information obtained from the console. At this time, for example, an error list prepared in advance may be referred to, and character information registered in the error list may be compared with error character information acquired by the error information acquisition unit 252 to make the determination. The character information registered in the error list is error character information indicating the error of the specific type. Moreover, in a case where an error image is included in the error information acquired by the error information acquisition unit 252, the error type determination unit 253 may determine whether or not the occurred error is the error of the specific type on the basis of the error image. At this time, an error image of the specific type prepared in advance may be referred to, and the error image of the specific type may be compared with an error image acquired by the error information acquisition unit 252 to make the determination.

Moreover, the error type determination unit 253 may determine whether or not the occurred error is the error of the specific type on the basis of the error image in response to the determination that the occurred error is not the error of the specific type on the basis of the error character information. As a result, when it is determined that the occurred error is of the specific type on the basis of the error character information, the error determination on the basis of the error image can be omitted. Therefore, it is possible to speed up and improve the efficiency of the determination as to whether or not the occurred error is of the specific type. Alternatively, the error type determination unit 253 may determine whether or not the occurred error is the error of the specific type using a learned model learned (for example, learning is performed by assigning a correct answer label to learning data) by learning data in which the error character information and the error image are input and a value as to whether the error is the error of the specific type is output. The error character information and the error image input here are error information on an error that has occurred or can occur in access to at least one of the web server 1 and another server other than the web server 1. As a result, the error determination accuracy can be improved. Incidentally, an algorithm of the supervised machine learning for generating the learned model is not particularly limited, but may be, for example, a deep learning algorithm. Moreover, the learned model is updated (optimized) in accordance with acquisition of a value as to whether the error is of the specific type.

The second access unit 254 re-accesses the web server 1 via the communication unit 21 and the network NW in response to the error type determination unit 253 determining that the occurred error is of the specific type. The re-access timing may be a time when it is determined that the occurred error is of the specific type or a time when a predetermined time (for example, 10 minutes) has elapsed from the time when it is determined that the occurred error is of the specific type. Alternatively, the second access unit 254 may set (in other words, setting according to the contents of the error of the specific type) a timing to re-access the web server 1 on the basis of the error information acquired by the error information acquisition unit 252, and may re-access the web server 1 on the basis of the set timing. As a result, it is possible to avoid occurrence of an error in the re-access as much as possible.

[2. Operation of Communication System S]

Figure 4:
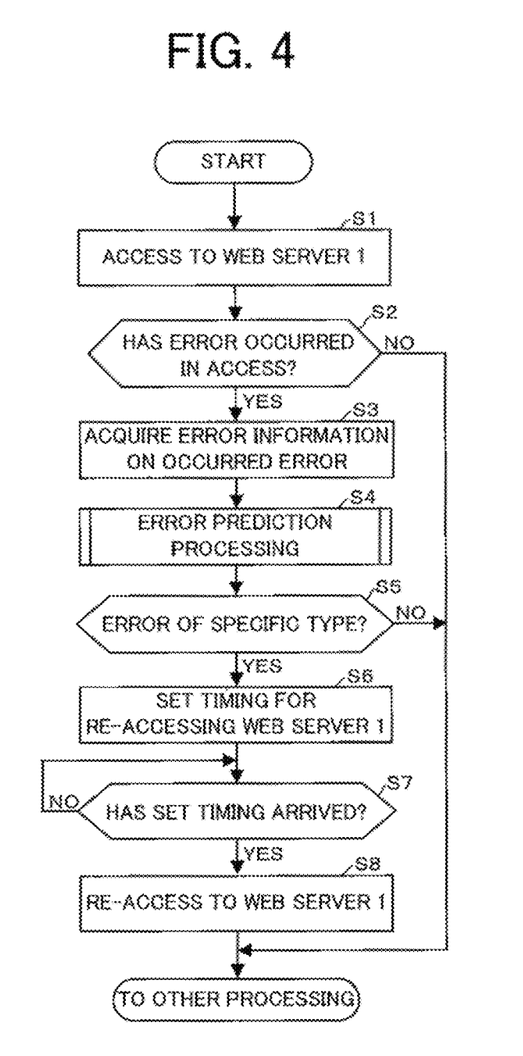
FIG. 4 is a flowchart illustrating an example of processing of the control unit 25 in the operator terminal 2.
Figure 5:
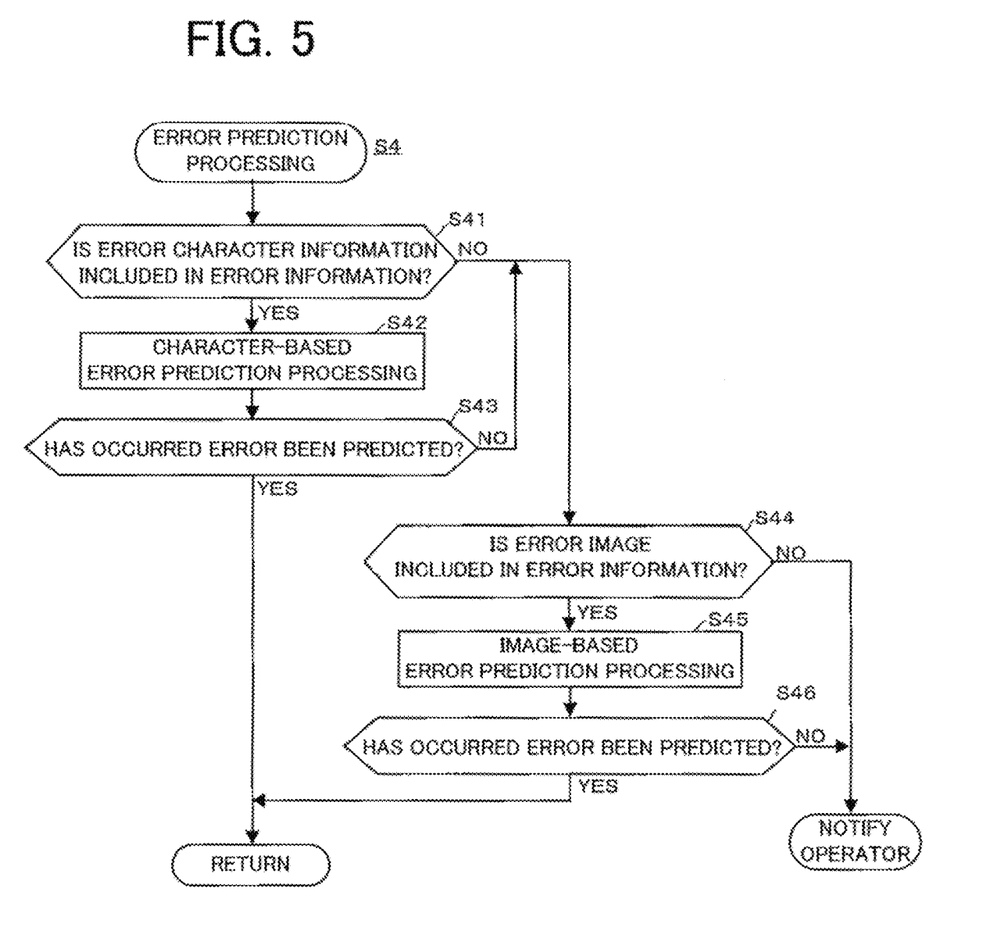
FIG. 5 is a flowchart illustrating a specific example 1 of an error prediction processing in step S4 illustrated in FIG. 4.
Figure 6:
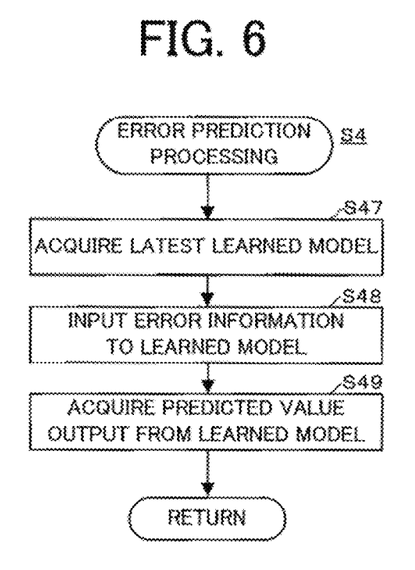
FIG. 6 is a flowchart illustrating a specific example 2 of the error prediction processing in step S4 illustrated in FIG. 4.

Next, an example of an operation performed in the communication system S will be described with reference to FIGS. 4 to 6. FIG. 4 is a flowchart illustrating an example of processing of the control unit 25 in the operator terminal 2. FIG. 5 is a flowchart illustrating a specific example 1 of an error prediction processing in step S4 illustrated in FIG. 4. FIG. 6 is a flowchart illustrating a specific example 2 of the error prediction processing in step S4 illustrated in FIG. 4.

The processing illustrated in FIG. 4 is performed, for example, once or more a day, and is started when the time set by the timer arrives. When the processing illustrated in FIG. 4 is started, the control unit 25 (first access unit 251) accesses the web server 1 via the communication unit 21 and the network NW (step S1). In such an access, as described above, the connection establishment processing and the test processing are executed. In a case where any error occurs during these processings, error information is transmitted from the web server 1, or error information is output from the OS or the console of the automatic test tool.

Next, the control unit 25 (first access unit 251) determines whether or not an error has occurred in the access to the web server 1 (step S2). For example, in a case where error information is received in the control unit 25, it is determined that an error has occurred. Incidentally, in a case where an error is indicated in the execution result obtained when the automatic test of the automatic test tool ends, it may be determined that an error has occurred. In a case where it is determined that an error has occurred in the access to the web server 1 (step S2: YES), the processing proceeds to step S3. On the other hand, in a case where it is determined that no error has occurred in the access to the web server 1 (step S2: NO), the processing illustrated in FIG. 4 ends, or the processing illustrated in FIG. 4 is started for another web server to be subjected to the operation test.

In step S3, the control unit 25 (error information acquisition unit 252) acquires error information on the occurred error (that is, the error that has occurred). That is, the error information transmitted from the web server 1 or the error information output from the OS or the console of the automatic test tool is acquired. Incidentally, the error information may be acquired from the execution result of the automatic test of the automatic test tool. Next, the control unit 25 (error type determination unit 253) executes error prediction processing on the basis of the error information acquired in step S3 (step S4). Here, a specific example of the error prediction processing illustrated in each of FIGS. 5 and 6 will be described.

In the error prediction processings shown in FIG. 5, the control unit 25 (error type determination unit 253) determines whether or not error character information is included in the error information acquired in step S3 (step S41). In a case where it is determined that the error character information is included in the error information (step S41: YES), the processing proceeds to step S42. On the other hand, in a case where it is determined that the error character information is not included in the error information (step S41: NO), the processing proceeds to step S44.

In step S42, the control unit 25 (error type determination unit 253) executes a character-based error prediction processing. The character-based error prediction processing is a processing of predicting (estimating) what the occurred error is on the basis of the error character information. In this case, for example, the control unit 25 (error type determination unit 253) registers in advance (for example, in the error list) character information (that may be an error code) indicating each of the plurality of types of errors. Then, the control unit 25 (error type determination unit 253) determines whether or not the error character information in the error information acquired in step S3 is registered. For example, it is determined whether character information matching the error character information is registered in the error list.

Next, the control unit 25 (error type determination unit 253) determines whether or not the occurred error has been predicted on a character basis (step S43). For example, in a case where the error character information acquired in step S3 is registered, it is predicted what the occurred error is. In this case, it is determined that the occurred error has been predicted on the character basis (step S43: YES), and the processing returns to the processing illustrated in FIG. 4. On the other hand, in a case where the error character information acquired in step S3 is not registered, it is not predicted what the error that has occurred is. In this case, it is determined that the occurred error has not been predicted on the character basis (step S43: NO), and the processing proceeds to step S44.

In step S44, the control unit 25 (error type determination unit 253) determines whether or not the error image is included in the error information acquired in step S3. In a case where it is determined that the error image is included in the error information (step S44: YES), the processing proceeds to step S45. On the other hand, in a case where it is determined that the error image is not included in the error information (step S44: NO), the operator is notified that it is impossible to predict what the occurred error is. After that, the processing illustrated in FIG. 4 ends and the processing proceeds to another processing, or the processing illustrated in FIG. 4 is started for another web server to be subjected to the operation test.

In step S45, the control unit 25 (error type determination unit 253) executes an image-based error prediction processing. The image-based error prediction processing is a processing of predicting what the occurred error is on the basis of the error image. In this case, for example, the control unit 25 (error type determination unit 253) registers in advance an error image indicating each of the plurality of types of errors (For example, it is registered in an error image list). Then, the control unit 25 (error type determination unit 253) uses a pattern recognition algorithm to collate the feature pattern (for example, the feature amount) appearing in the registered error image with the feature pattern appearing in the error image in the error information acquired in step S3, determining whether or not the degree of similarity between them is equal to or greater than a threshold value. Supervised machine learning (for example, deep learning) may be used as such a pattern recognition algorithm.

Next, the control unit 25 (error type determination unit 253) determines whether or not the occurred error has been predicted on an image basis (step S46). For example, in a case where an error image having the degree of similarity equal to or greater than a threshold value with the error image acquired in step S3 is registered, it is predicted what the occurred error is, it is determined that the occurred error has been predicted on the image basis (step S46: YES), and the processing returns to the processing illustrated in FIG. 4. On the other hand, in a case where the error image having the degree of similarity equal to or greater than the threshold value with the error image acquired in step S3 is not registered, it is not predicted what the occurred error is. Therefore, it is determined that the occurred error has not been predicted on the image basis (step S46: NO), and the operator is notified that it is impossible to predict what the occurred error is. After that, the processing illustrated in FIG. 4 ends and the processing proceeds to another processing, or the processing illustrated in FIG. 4 is started for another web server to be subjected to the operation test.

On the other hand, in the error prediction processing illustrated in FIG. 6, the control unit 25 (error type determination unit 253) acquires the latest learned model learned by the above-described learning data from the storage unit 24 (step S47). Next, the control unit 25 (error type determination unit 253) inputs the error information (at least one of the error character information and the error image) acquired in step S3 to the learned model acquired in step S47 as an explanatory variable (step S48). Next, the control unit 25 (error type determination unit 253) acquires a predicted value (a predicted value as to whether the occurred error is an error of the specific type) output as an objective variable from the learned model (step S49), and returns to the processing illustrated in FIG. 4. That is, the control unit 25 (error type determination unit 253) predicts whether the occurred error is an error of the specific type from the error information acquired in step S3 and the learned model. Incidentally, the predicted value may be represented by a binary value (that is, 0 or 1) indicating whether or not the occurred error is the error of the specific type or may be represented by a probability (for example, 80%) indicating that the occurred error is the error of the specific type.

Returning to the processing illustrated in FIG. 4, the control unit 25 (error type determination unit 253) determines whether or not the occurred error is the error of the specific type with reference to the result of the error prediction processing executed in step S4 (step S5). For example, in a case where the error predicted in the error prediction processing illustrated in FIG. 5 is the error of the specific type, it is determined that the occurred error is the error of the specific type (step S5: YES), and the processing proceeds to step S6. Alternatively, in a case where the predicted value acquired in the error prediction processing illustrated in FIG. 6 indicates the error of the specific type or in a case where the probability that the predicted value is the error of the specific type is greater than a threshold value, it is determined that the occurred error is the error of the specific type (step S5: YES), and the processing proceeds to step S6.

In step S6, the control unit 25 (second access unit 254) sets a timing for re-accessing the web server 1 on the basis of the error information acquired in step S3. For example, in a case where the occurred error of the specific type is an error indicating that some kind of problem has occurred in the web server 1, the timing to access the web server 1 is set to 30 minutes after the current point of time. Alternatively, in a case where the occurred error of the specific type is an error indicating that the limit of the number of simultaneous accesses to the web server 1 is exceeded, the timing to access the web server 1 is set to 60 minutes after the current point of time. On the other hand, if the occurred error of the specific type is an error indicating that maintenance is being performed, and if the end timing of the maintenance can be specified from the acquired error information, the end timing is set as the timing to access the web server 1.

Next, the control unit 25 (second access unit 254) determines whether or not the timing set in step S6 has arrived (step S7). In a case where it is determined that the timing set in step S6 has not arrived (step S7: NO), the determination is repeated. On the other hand, in a case where it is determined that the timing set in step S6 has arrived (step S7: YES), the control unit 25 (second access unit 254) re-accesses the web server 1 via the communication unit 21 and the network NW (step S8). In such re-access, connection establishment processing, or connection establishment processing and test processing are executed, and for example, retry is performed a predetermined number of times until no error occurs, and when no error occurs, the processing illustrated in FIG. 4 ends and proceeds to another processing, or the processing illustrated in FIG. 4 is started for another web server subjected to the operation test.

As described above, according to the above embodiment, when an error that has occurred in the access to the web server 1 via the network NW is detected, it is determined whether or not the error that has occurred is the error is of the specific type on the basis of the error information on the error that has occurred. Then, in response to the determination that the occurred error is the error of the specific type, the web server 1 is re-accessed. Therefore, in a case where the error occurs in the access to the web server 1, the re-access can be appropriately controlled. For example, it is possible to appropriately control the re-access to the web server 1 in a manner that the re-access (retry) is promptly executed when the error that has occurred in the access to the web server 1 is a temporary error, and the re-access is not executed when the occurred error is not resolved early. According to the past statistical results, among the plurality of types of errors, the ratio of temporary errors that can be resolved with the lapse of time accounts for about 70% of the total, which is the largest. Therefore, as in the above embodiment, by automatically determining the type of the occurred error and appropriately controlling the re-access, it is possible to greatly reduce the burden of determining the type of the occurred error and taking measures on the operator (for example, a test performer) side.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. For example, in the above embodiment, an example in which the operator terminal 2 directly accesses the web server 1 has been described. However, the present invention can also be applied to a case where a test execution server that has received the execution command transmitted from the operator terminal 2 accesses the web server 1 in response to the execution command. In this case, when detecting an error that has occurred in the access to the web server 1, the test execution server acquires error information on the occurred error, similarly to the above embodiment. Then, the test execution server determines whether or not the occurred error is the error of the specific type on the basis of the acquired error information, and re-accesses the web server 1 in response to the determination that the occurred error is the error of the specific type.

Moreover, in the above embodiment, the case where the operation test of the web server 1 is performed has been described as an example. However, the present invention can also be applied to other than the operation test of the web server 1. For example, the present invention can also be applied to a case where the search server accesses a plurality of servers in crawling on the network NW. In this case, when detecting an error that has occurred in the access to the server to be subjected to crawling, the search server acquires error information on the occurred error, similarly to the above embodiment. Then, the search server determines whether or not the occurred error is the error of the specific type on the basis of the acquired error information, and re-accesses the server in response to the determination that the occurred error is the error of the specific type. Then, in a case where the error is resolved in the re-access, the search server accesses the next server to be subjected to crawling and executes the similar processing as described above. Moreover, in the above embodiment, the error of the specific type is a temporary error that can be resolved with the lapse of time, but may be an error other than such an error. Such an error may be an error that can be resolved by a command (for example, a restart command) from the outside (device that detected the error) to the accessed web server.

REFERENCE SIGNS LIST

1 Web server
2 Operator terminal
21 Communication unit
22 Display unit
23 Operation unit
24 Storage unit
25 Control unit
251 First access unit
252 Error information acquisition unit
253 Error type determination unit
254 Second access unit
NW Network
S Communication system

What is claimed is:

1. An access method executed by at least one computer, the access method comprising:
   accessing a predetermined server from the at least one computer;
   acquiring error information on an error that has occurred in the accessing of the predetermined server by the at least one computer;
   identifying whether the error that has occurred is an error of a specific type based on the error information; and
   based on identifying that the error is the error of the specific type, re-accessing the predetermined server from the at least one computer,
   wherein the error information comprises at least one of error character information extracted from an error screen displayed on a display of the at least one computer, error character information obtained from a console of software configured to give a predetermined command to the predetermined server, and an image of the error screen displayed on the display of the at least one computer, and
   wherein the access method further comprises:
      identifying whether the error that has occurred is the error of the specific type based on the error character information; and
      based on identifying that the error that has occurred is not the error of the specific type based on the error character information, identifying whether the error that occurred is the error of the specific type based on the image of the error screen.

2. The access method of claim 1, wherein the error of the specific type comprises a temporary error that can be resolved with a lapse of time.

3. The access method of claim 1, wherein the error information comprises error character information extracted from an error screen displayed on a display of the at least one computer.

4. The access method of claim 1, wherein the error information comprises an image of an error screen displayed on a display of the at least one computer.

5. The access method of claim 1, wherein the error information comprises error character information obtained from a console of software configured to give a predetermined command to the predetermined server.

6. The access method of claim 1,
   wherein the error information comprises at least one of error character information extracted from an error screen displayed on a display of the at least one computer, error character information obtained from a console of software configured to give a predetermined command to the predetermined server, and an image of the error screen displayed on the display of the at least one computer, and
   wherein the access method further comprises:
      identifying whether the error that has occurred is the error of the specific type based on the error character information; and
      identifying whether the error that has occurred is the error of the specific type based on the image of the error screen.

7. The access method of claim 1, wherein the identifying is performed using a learned model learned by learning data comprising an input and an output, wherein the input comprises error information on the error that has occurred in accessing at least one of the server and another server by the at least one computer or error information on an error that can occur in accessing at least one of the server and the other server by the at least one computer, and the output comprises a value as to whether the error is the error of the specific type.

8. The access method of claim 1, further comprising:
   setting a timing for re-accessing the server by the at least one computer based on the error information,
   wherein the re-accessing the server further comprises re-accessing the server by the at least one computer based on the set timing.

9. The access method of claim 1, wherein the access method is executed in conjunction with performance of an operation test of the predetermined server.

10. A communication system comprising:
    one or more computers configured to communicate over a network, wherein the one or more computers comprises a first computer and a server,
    wherein the first computer comprises:
       at least one memory configured to store program code; and
       at least one processor configured to access the program code and operate as instructed by the program code, the program code comprising:
          first access code configured to cause at least one of the at least one processor to access the server over the network;
          acquisition code configured to cause at least one of the at least one processor to acquire error information on an error that has occurred in the access to the server;
          identification code configured to cause at least one of the at least one processor to identify whether the error that has occurred is an error of a specific type based on the error information; and
          second access code configured to cause at least one of the at least one processor to re-access the server based on the identification that the error is of the specific type,
    wherein the error information comprises at least one of error character information extracted from an error screen displayed on a display of the first computer, error character information obtained from a console of software configured to give a predetermined command to the server, and an image of the error screen displayed on the display of the first computer, and wherein the identification code if furtherer configured to cause at least one of the at least one processor to identify whether the error that has occurred is the error of the specific type based on the error character information and, based on identifying that the error that has occurred is not the error of the specific type based on the error character information, identify whether the error that occurred is the error of the specific type based on the image of the error screen.

11. The communication system of claim 10, wherein the error of the specific type comprises a temporary error that can be resolved with a lapse of time.

12. The communication system of claim 10, wherein the error information comprises error character information extracted from an error screen displayed on a display of the first computer.

13. The communication system of claim 10, wherein the error information comprises an image of an error screen displayed on a display of the first computer.

14. The communication system of claim 10, wherein the error information comprises error character information obtained from a console of software configured to give a predetermined command to the server.

15. The communication system of claim 10, wherein the identification code is further configured to cause at least one of the at least one processor to identify whether the error that has occurred is an error of a specific type using a learned model learned by learning data comprising an input and an output, wherein the input comprises error information on the error that has occurred in accessing at least one of the server and another server or error information on an error that can occur in accessing at least one of the server and the other server, and the output comprises a value as to whether the error is the error of the specific type.

16. The communication system of claim 10,
wherein the program code further comprises:
timing code configured to cause at least one of the at least one process to set a timing for re-accessing the server based on the error information, and
wherein the second access code is further configured to cause at least one of the at least one processor to re-access the server based on the set timing.

17. The communication system of claim 10, wherein the program code is executed in conjunction with performance of an operation test of the server.

18. A non-transitory computer readable memory having stored thereon, which when executed by at least one processor cause at least one of the at least one processor to execute an access method comprising:
accessing a server from at least one computer;
acquiring error information on an error that has occurred in the accessing of the server by the at least one computer;
identifying whether the error that has occurred is an error of a specific type based on the error information; and
based on identifying that the error is the error of the specific type, re-accessing the server from the at least one computer,
wherein the error information comprises at least one of error character information extracted from an error screen displayed on a display of the at least one computer, error character information obtained from a console of software configured to give a predetermined command to the predetermined server, and an image of the error screen displayed on the display of the at least one computer, and
wherein the access method further comprises:
identifying whether the error that has occurred is the error of the specific type based on the error character information; and
based on identifying that the error that has occurred is not the error of the specific type based on the error character information, identifying whether the error that occurred is the error of the specific type based on the image of the error screen.

\* \* \* \* \*